United States Patent Office 3,792,028
Patented Feb. 12, 1974

3,792,028
HYDROPHILIC GEL POLYMERS OF VINYL
PYRROLIDONE AND HYDROXYL ALKYL
METHACRYLATE
Maurice Seiderman, 3306 Deronda Drive,
Hollywood, Calif 90028
No Drawing. Continuation-in-part of application Ser. No. 92,280, Nov. 23, 1970, now Patent No. 3,721,657, which is a continuation-in-part of application Ser. No. 845,499, July 28, 1969, now Patent No. 3,639,524. This application Dec. 30, 1971, Ser. No. 214,418
The portion of the term of the patent subsequent to Mar. 20, 1990, has been disclaimed
Int. Cl. C08f 17/00
U.S. Cl. 260—80.72                    8 Claims

ABSTRACT OF THE DISCLOSURE

A plastic or resin product is obtained by mixing a comminuted pyrrolidone such as polyvinylpyrrolidone, and optionally modifiers and additives such as organic methacrylates, and optionally crosslinking agents, and optionally catalysts, and causing polymerization to take place. The inventive product is insoluble in water but is hydratable with water, depending upon the proportions of the above mentioned components, and may take up in its structure as little as 5% by weight of water to as high as 90% by weight of water. The inventive hydrated product is optionally transparent, translucent, or opaque, and produced in any shape or size, depending only on the mold in which it is cast. The transparent product is especially suitable for contact lenses. The translucent and opaque products may be fabricated into membranes with pore sizes that can be made selectively, or cast into useful shapes and for other uses.

CROSS REFERENCE TO RELATED APPLICATIONS

This application is a continuation-in-part of co-pending application Ser. No. 92,280, filed Nov. 23, 1970, now U.S. Pat. No. 3,721,657, which in turn is a continuation-in-part of co-pending application Ser. No. 845,499, filed July 28, 1969, now U.S. Pat. No. 3,639,524.

This invention relates to transparent, optically clear or translucent or opaque polymers suitable for manufacturing contact lenses or other uses, and particularly to such polymers that have been prepared with modifiers and crosslinking agents, and the method of preparation of the modified, crosslinked, optically clear polymers.

Polyvinylpyrrolidone is prepared by the Reppes process. 1,4-butanediol obtained in the Reppe butadiene synthesis is dehydrogenated over copper at 200° C. to form 2-butyrolactone which, when reacted with ammonia, gives pyrrolidone. Reacting pyrrolidone with acetylene gives the vinyl pyrrolidone monomer. The monomer is polymerized by heating it in the presence of hydrogen peroxide and ammonia, as represented by the following equation:

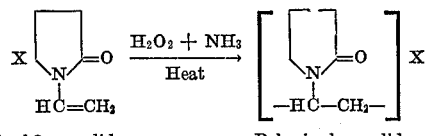

N-vinyl-2-pyrrolidone         Polyvinylpyrrolidone

Polyvinylpyrrolidone is a faintly yellow solid resembling albumin and having a medium molecular weight of about 25,000. It is soluble in water giving a colloidal solution. It has been employed to increase blood volume in shock cases and as an additive to blood plasma.

It is an object of this invention to provide pyrrolidone polymers or resins which, unlike polyvinylpyrrolidone itself, are substantially insoluble in water and aqueous solutions or fluids of the type found in the animal body.

Another object of the invention is to provide a method for preparing substantially water insoluble, optically clear, modified polyvinylpyrrolidone polymers or resins.

Another object of the invention is to provide a method for the preparation of substantially water-insoluble films and membranes with selectively structure pore sizes.

Additional objects of the invention will become apparent from the following description, which is given primarily for purposes of illustration, and not limitation.

Stated in general terms, the objects of the invention are attained by reacting a mixture of pyrrolidone such as polyvinylpyrrolidone or vinylpyrrolidone, a modifier such as an organic methacrylate, preferably a hydroxyalkyl methacrylate; and preferably a crosslinking agent such as an olefin, preferably an olefin hydroxyalkyl methacrylate; and preferably a catalyst such as an organic peroxide. The reaction product preferably is treated or extracted with water to hydrate the product or to extract unreacted or water-soluble materials respectively.

The polyvinylpyrrolidone should be comminuted, for example, powdered to pass an eighty-mesh screen.

Another object of the invention is to provide a material which can be made into cast products for prostheses and other shapes such as intra-uterine devices.

Another object of the invention is to provide a substance which can be used for coating solids to provide a hydrophilic surface.

The resulting modified and crosslinked polyvinylpyrrolidone resins, or polymers are insoluble in water or aqueous body fluids. They are clear, transparent, or translucent or opaque and flexible or rubbery or stiff depending upon the amounts and types of modifiers and crosslinking agents used. The physical properties of the resins or polymers of the invention are controlled by controlling the ratios of the modifier and the crosslinking agent to the amount of the total pyrrolidone used in the reaction mixture. Completely crosslinked polymers or resins can be made in accordance with the invention, which are hard and infusible and can be machined and polished to an optical finish for such purposes as contact lenses, for example. Incompletly crosslinked polymers or resins of the invention are fusible and can be pressed into molds. Complete crosslinking can be accomplished by heating the molds under pressure.

The reaction mixture can contain from 0% to about 85% of polyvinylpyrrolidone, or it can contain from 0% to about 85% of vinylpyrrolidone, the balance of the ingredients depending upon the physical properties desired in the polymers or resins produced. The proportion of vinylpyrrolidone in the total mixture should be in the range from 0% to about 85% of the total mixture. The proportion of polyvinylpyrrolidone in the total mixture should be in the range from 0% to about 85% of the total mixture. The combination of the selected pyrrolidone such as vinylpyrrolidone or polyvinylpyrrolidone can be made in all proportions, or vinylpyrrolidone can be used alone as can polyvinylpyrrolidone.

The ratio of monomeric modifiers to substituted pyrrolidone can vary from about 15:85 to about 99:1 and especially about 60:40. (The ratio is calculated by weight.)

Similarly, the ratio of the amount of crosslinking agent can vary from 0 to about 25 parts, preferably from about 0.1 to about 7 parts, and especially from about 1 to about 5 parts by weight for each 100 parts of the selected substituted pyrrolidone or mixtures thereof.

Among the hydroxyalkyl methacrylate modifiers that can be used in preparing the polyvinylpyrrolidone polymers, or resins, of the invention are: 2-hydroxyethyl methacrylate and 2-hydroxypropyl methacrylate. Alkylamino alkylmethacrylates such as 2-dimethylaminoethyl methacrylate and 2-butylaminoethyl methacrylates can be used asc modifiers. Other examples of methacrylates that can be used as modifiers are methacrylamide, cyclohexyl methacrylate, and tetrahydrofurfuryl methacrylate, as well as olefin glycol methacrylates such as triethylene glycol monomethacrylate, tetraethylene glycol monomethacrylate and propylene glycol monomethacrylate. Other examples of modifiers are dimethylamino ethyl methacrylate, piperidinoethyl methacrylate, morpholinoethyl methacrylate, etc.

Among the crosslinking agents that can be used in accordance with the invention are olefin glycol dimethacrylates such as ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, and 1,3-butylene glycol dimethacrylate. Other examples of crosslinking agents are with N-methylol acrylamide acid, methacrylyl.

By way of amplifying the disclosure, a number of modifiers and crosslinking agents are given below, with notes as to the particular contribution made to physical properties of the final resin:

Ethylene diacrylate (S)—makes product softer
Tetrahydrofurfuryl methacrylate—imparts strength
Butylene glycol dimethacrylate—imparts strength and crosslinks
Allyl methacrylate—stiffens and reduces water content
Ethylene glycol dimethacrylate—crosslinks
N-methylol acrylamide—plasticizes and crosslinks
Trimethylol propane trimethacrylate—crosslinks
Triethylene glycol dimethacrylate—crosslinks
Butyl methacrylate—toughens and reduces water content
Methyl acrylamide—acts an an extender
Polyethylene glycol dimethacrylate—crosslinks
Trimethylol propane triacrylate—softens, toughens and crosslinks
Methyl methacrylate—increases swelling
Lauryl methacrylate—toughens
Polymer of ethylene oxide—increases water content
Co-polymer of ethylene oxide and acrylic acid—gives strength.

All of these may be used alone, or combined as desired.

Among the catalysts that can be used in preparing the polymers or resins of the invention are organic peroxides such as benzoyl peroxides, lauryl peroxide, cumene hydroperoxide, dibutyl peroxide, etc. Other suitable catalysts are azobisisobutyronitrile, tertiary butyl peroxide, tertiary butyl hydroperoxide, ammonia plus hydrogen peroxide, and others. Catalysts that are harmless or noninjurious if left remaining in the products or resins, are preferred although the removal of these residues is done by extraction by hydration in large volumes of water or a continuous flow of water. The amount of catalysts employed generally ranges from 0% to about 5% of the reaction mixture. Certain compositions of the mixture require very little catalyst; others require a great deal more; and some give satisfactory resins with none. To speed up polymerization, an accelerator may be used, such as N,N--dimethyl-p-toluidine or N,N-dimethyl-aniline and others.

The reaction mixture is then raised to a temperature of from about 50° C. to about 120° C. or even higher, but preferably about 60° C. to 70° C., and maintained within that temperature range until polymerization is completed, which in general requires from about ½ to about 24 hours depending upon the temperature, amount of catalyst, if any, and relative proportions of components. With accelerators, room temperature polymerization is possible.

The following examples illustrate the invention:

Example 1

A reaction mixture is prepared by mixing 100 grams polyvinylpyrrolidone, 75 milliliters vinylpyrrolidone, 50 milliliters hydroxyethyl methacrylate, 1% ethylene glycol dimethacrylate and 0.5 gram benzoyl peroxide. The resulting mixture was poured into ⅝ inch diameter glass tubes coated with a fluorocarbon to prevent sticking of the product to the tube or breakage due to shrinkage or expansion during the polymerization reaction. The tubes were capped and placed in a hot circulating oven kept at about 65° C. for about two hours. The oven was shut off and the polymerization product was permitted to cool to room temperature. The tubes were then broken away and the rods of polyvinylpyrrolidone resin product were obtained. A portion of each rod was cut off to a specified thickness and the weight noted. The cut off portion was placed in water and permitted to swell by water absorption or hydration. The amount of swelling was measured. The resultant polymer absorbed 87.2% water.

The polymer was crushed to powder. It was extracted of all water-soluble debris using continuous hot distilled water. It was sterilized by autoclaving and using a hypodermic needle, was injected into a muscle of an experimental animal. The animal was sacrificed after four months, and histological sections containing this polymer showed no capsule formation and no illicited response, but showed normal tissue in growth in a healthy, intimate contact with the polymer. The powder can be used as a desiccator in vacuum systems or a means for removing water from gases.

Example 2

A reaction mixture was prepared by mixing 50 grams polyvinylpyrrolidone, 5 milliliters vinylpyrrolidone, 50 milliliters hydroxyethyl methacrylate, 5 milliliters ethylene glycol dimethacrylate and 0.1 gram benzoyl peroxide. The resulting reaction mixture was reacted in the same manner as described in Example 1. The cut off portions of the product's rods absorbed only half as much water and swelled only half as much as the product rods produced by Example 1.

Example 3

Hydroxypropyl methacrylate was substituted for hydroxyethyl methacrylate in Example 1 and the reaction conditions of Example 1 were repeated. The product thus produced was more transparent and tougher than the product obtained in Example 1 with much lower water content.

Example 4

Hydroxypropyl methacrylate was substituted for hydroxyethyl methacrylate in Example 2. Otherwise, the polymers were prepared as in the case of Example 2. Again the product polymer or resin rods were tougher and more transparent than those resulting in Example 2.

Example 5

50 milliliters hydroxypropyl methacrylate was mixed with 50 milliliters of hydroxyethyl methacrylate. 25 grams of polyvinylpyrrolidone was dissolved in the mixture. 0.1 milliliter vinylpyrrolidone was added. No catalyst was used. Polymerization took 12 hours at 60° C. The product polymer or resin rods were optically transparent, very strong, resilient, and easily machinable and were made into contact lenses and worn after hydration without any difficulty. The water content was 30%.

Example 6

70% of hydroxyethyl methacrylate was mixed with 30% of vinylpyrrolidone. No catalyst was used. The mixture was poured into florocarbon treated glass tubes, sealed, and polymerized for 12 hours at 70° C. The product polymer or resin rods were optically transparent, very strong, easily machinable, and were made into contact lenses which, after hydration, contained over 50% water.

Example 7

The same proportions as in Example 6, but hydroxyethyl methacrylate was substituted by hydroxypropyl methacrylate. The resulting polymer or resin rods were just as transparent and stronger, but the water content was reduced to about 40%.

Example 8

29 grams of polyvinylpyrrolidone was mixed with 70 milliliters hydroxyethyl methacrylate until the polyvinylpyrrolidone was completely dissolved. 1 milliliter tetrahydrofurfuryl methacrylate was then added. No vinylpyrrolidone was used. No catalyst was used. Polymerization took 12½ hours at 65° C. The product polymer or resin rods were optically transparent, strong, and easily machinable, and of pale amber color. The water content of the polymer upon hydration was about 47%.

Example 9

100 milliliters of hydroxyethyl methacrylate was mixed with 10 milliliters of vinylpyrrolidone and 8.5 grams of polyvinylpyrrolidone and 1 milliliter of N-methacrylate-amide and 0.5 milliliters of tetraethylene glycol dimethacrylate. The entire mixture was catalyzed with 500 milligrams of benzoyl peroxide. Before pouring into molds, 10 microliters of N,N-dimethyl-p-toluidene were added and mixed for one minute. Molds were poured and polymerization was completed at room temperature for half an hour. The temperature of the mixture during polymerization went to 147° C.

As mentioned hereinabove the hydrophilic polymers of the present invention are particularly adapted for the preparation of contact lenses. Such lenses can be readily prepared by the general methods used for preparing contact lenses from hydrophilic polymers, which are well known to those skilled in the art and involve conventional cutting, machining grinding, and polishing operations. Accordingly, contact lenses using the herein described hydrophilic polymers can be prepared by the techniques described in U.S. 3,361,858, U.S. 3,408,429, U.S. 3,496,254, and U.S. 3,497,577. Other general techniques well known to those skilled in the art are described in French Pats. 1,342,447 and 1,422,109 and British Pat. 1,174,683.

A preferred method of making the contact lenses involves preparing polymerized rods as described in Example 1. Polypropylene tubes are preferably used instead of the glass tubes in order to facilitate the removal of the rods from the tubes.

The cast rods are then cut to size. The roughly cut blanks are aproximately 19/64″ (.297 or 7.5 mm.) thick and 9/16″ (.562 or 14.5 mm.) in diameter.

Since cutting sets up internal stresses in the polymer, each button ready for production undergoes an additional annealing operation by exposure for at least two hours at 78° C. in a circulating air oven.

After the blank is annealed, it is kept away from the open air as the material is highly hygroscopic.

The blank is then placed into a collet and the proper negative curve (base curve) is cut into the blank and the blank is reduced to the proper diameter.

After the blanks are cut to precise size, the annealing is repeated for one hour, after which time the blanks are placed in a Mason jar or vacuum desiccator and sealed tightly to keep out all moisture from the air.

All cutting is done with diamond tools, with the lathe revolving at a high speed and with a slow tool approach. Deep cuts are avoided since they may produce invisible fractures that could eventually cause breaking of the lens when in use.

When the base curve is cut and before the blank is removed from the lathe, it can be reduced to the proper diameter and the edges may be finished on the lathe.

The blank is then polished with a conventional polish. The polishing blocks and laps can be of any material. Stainless steel (303), "Lucite" or "Plexiglas" are preferred.

The best base curve polishing has been done by using a "Plexiglas" block with handkerchief-type cotton cloth tightly stretched and held in place with a neoprene O-ring (preferably with a loop of stainless steel wire).

For blocking, a low temperature wax is generally used. Over heating the compound is avoided as this may affect the polished surface. In removing the lens from the blocking compound, the arbor is warmed and any blocking compound sticking to the lens is removed with Reagent grade Petroleum Ether, wiping with a soft tissue.

After the lenses are checked for dimensions and power while in the dry state, they are extracted in order to remove all debris resulting from manufacturing procedures.

The extraction is carried out with a buffered saline solution containing 0.9% sodium chloride and 0.004% sodium bicarbonate. This solution will have a pH of from about 7.0 to 7.2. The saline solution is kept at about 68° C. and the lenses are placed in the heated, circulated solution overnight. A condenser is used to minimize solvent loss.

The clean and aseptic lenses are removed and each stored in about 10 cc. of sterile, buffered saline.

During extraction, the lenses will change in size and power. The thickness, the diameter and both curvatures will increase and the power of the lens will decrease.

Obviously, many other modifications and variations of the modified and crosslinked polyvinylpyrrolidone polymers, or resins, and method of the invention are possible in the light of the teachings given hereinabove. It is, therefore, to be understood that, within the scope of the appended claims, the invention can be practiced otherwise than as specifically described.

What is claimed is:

1. A contact lens comprising a hydrophilic polymer consisting essentially of a polymerized mixture of vinylpyrrolidone and a hydroxyalkyl methacrylate in a weight ratio to the vinylpyrrolidone of from 15:85 to about 99:1, from zero to about 25 parts of a crosslinking agent, and an amount of catalyst ranging from zero to about five grams thereof for each 100 grams of reaction mixture.

2. The contact lens of claim 1 wherein the crosslinking agent is present and is selected from the group consisting of ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, and methacrylic acid with N-methylol acrylamide.

3. The contact lens of claim 1 wherein the catalyst is present and is selected from the group consisting of benzoyl peroxide, lauryl peroxide, cumene hydroperoxide, dibutyl peroxide, azobisisobutyronitrile, tertiary butyl peroxide, tertiary butyl hydroperoxide, and ammonia plus hydrogen peroxide.

4. The contact lens of claim 1 wherein the crosslinking agent is present and is selected from the group consisting of ethylene glycol dimethacrylate, diethylene glycol dimethacrylate, triethylene glycol dimethacrylate, tetraethylene glycol dimethacrylate; polyethylene glycol dimethacrylate, 1,4-butylene glycol dimethacrylate, 1,3-butylene glycol dimethacrylate, and methacrylic acids, with N-methylol acrylamide and the catalyst is present and is selected from the group consisting of benzoyl peroxide, lauryl peroxide, cumene hydroperoxide, dibutyl peroxide, azobisisobutyronitrile, tertiary butyl peroxide, tertiary butyl hydroperoxide, and ammonia plus hydrogen peroxide.

5. The contact lens of claim 1 wherein the hydroxyalkyl methacrylate is hydroxyethyl methacrylate or hydroxypropyl methacrylate.

6. The contact lens of claim 2 wherein the hydroxyalkyl methacrylate is hydroxyethyl methacrylate or hydroxypropyl methacrylate.

7. The contact lens of claim 3 wherein the hydroxyalkyl methacrylate is hydroxyethyl methacrylate or hydroxypropyl methacrylate.

8. The contact lens of claim 4 wherein the hydroxyalkyl methacrylate is hydroxyethyl methacrylate or hydroxypropyl methacrylate.

References Cited
UNITED STATES PATENTS

| | | | |
|---|---|---|---|
| 3,621,079 | 10/1968 | Leeds | 260—885 |
| 3,532,679 | 10/1970 | Steckler | 260—80.72 |

PAUL LIEBERMAN, Primary Examiner

U.S. Cl. X.R.

260—29.6 WB, 86.1 N, 876 R, 885, 895